(12) United States Patent
Graumann

(10) Patent No.: US 7,349,702 B2
(45) Date of Patent: Mar. 25, 2008

(54) SELF-EVOLVING PROXIMITY SENSOR INCLUSION-EXCLUSION ZONES

(76) Inventor: David L. Graumann, 4559 NW. Silverleaf Dr., Portland, OR (US) 97229

( * ) Notice: Subject to any disclaimer, the term of this patent is extended or adjusted under 35 U.S.C. 154(b) by 859 days.

(21) Appl. No.: 10/742,482

(22) Filed: Dec. 18, 2003

(65) Prior Publication Data

US 2005/0135292 A1 Jun. 23, 2005

(51) Int. Cl.
*H04Q 7/20* (2006.01)
(52) U.S. Cl. ............... 455/450; 455/422.1; 455/464; 455/457; 455/456.1; 455/456.6; 370/328; 370/337; 370/338; 370/339
(58) Field of Classification Search ............... 455/450, 455/422.1, 464, 456.1, 456.6, 457; 370/328–338, 370/339
See application file for complete search history.

(56) References Cited

U.S. PATENT DOCUMENTS

| 5,933,420 | A * | 8/1999 | Jaszewski et al. ......... 370/329 |
| 7,013,143 | B2 * | 3/2006 | Love et al. ................. 455/450 |
| 7,054,627 | B1 * | 5/2006 | Hillman ................... 455/422.1 |
| 7,127,258 | B2 * | 10/2006 | Zegelin ................... 455/456.1 |
| 2002/0168969 | A1 * | 11/2002 | Koskinen et al. ........... 455/424 |
| 2003/0222820 | A1 * | 12/2003 | Karr et al. ................. 342/457 |

FOREIGN PATENT DOCUMENTS

| EP | 1 102 085 A | 5/2001 |
| EP | 1 195 614 A1 | 4/2002 |

OTHER PUBLICATIONS

PCT Search Report and Written Opinion dated May 6, 2005.
International Preliminary Report on Patentability, Application No. PCT/US2004/040139.

* cited by examiner

*Primary Examiner*—Rafael Perez-Gutierrez
*Assistant Examiner*—Khai Nguyen
(74) *Attorney, Agent, or Firm*—Joni Stutman-Horn

(57) ABSTRACT

An indoor location awareness method for locating a device using device-observable signals of known proximity sensors and device-unobservable signals of known proximity sensors. The exclusion of the possibility that the device is within an unobservable proximity sensor's range increases the knowledge of the device's true location. In addition to defining the location of the device, the device can predict the arrival and departure of unobservable proximity sensors as it moves throughout the environment.

28 Claims, 4 Drawing Sheets

SELF-EVOLVING PROXIMITY SENSOR INCLUSION-EXCLUSION ZONES

FIELD OF THE INVENTION

The present invention is generally related to location awareness technology. More particularly, the present invention is related to a method for indoor location awareness of an electronic device.

DESCRIPTION

Several techniques exist for determining the location of an electronic device. One such technique is a Global Positioning System (GPS). Unfortunately, GPS cannot be used for determining the location of an electronic device when the device is used indoors. Many indoor systems for location awareness are based on 802.11 range determination between a proximity sensor, such as, for example, an access point (AP), and a client device, such as a client radio. Unlike GPS, which is funded by and controlled by the U.S. Department of Defense (DOD), indoor positioning systems require someone to install the access points and maintain them over time.

Indoor systems based on 802.11 allow the client device to identify access points within its receiver's sensitivity range to determine its location. In other words, the client device cannot see beyond any access points that are unobservable.

Thus, what is needed is an indoor location awareness method that enables access points to be self describing (i.e., where they are located, what they transmit, and what neighboring APs are within their view) to lessen the burden of the building owner in maintaining the access points. What is further needed is an indoor location awareness method that enables a client device to obtain information from the observable access points as well as the unobservable access points.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Figure 1:
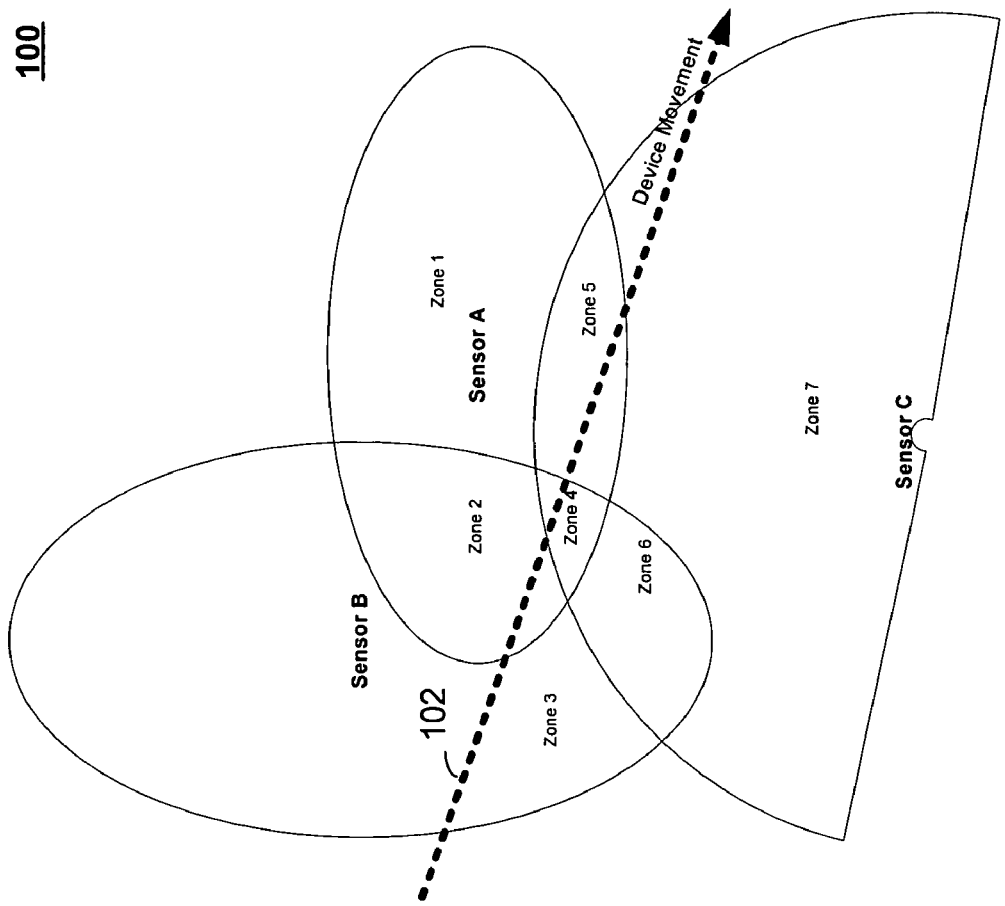
FIG. 1 is a diagram illustrating the movement of a mobile device through a building implementing proximity sensors according to an embodiment of the present-invention.

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrases "in one embodiment" or "in an embodiment" appearing in various places throughout the specification are not necessarily all referring to the same embodiment.

Embodiments of the present invention are directed to location awareness methods for locating a device using device-observable signals of known 802.11 access points and device-unobservable signals of known 802.11 access points. The exclusion of the possibility that a device is within an unobservable access point's range increases the knowledge of the device's true location. The device can also share its refined location if needed.

In addition to refining the location of a device, the device can predict what is going to happen if it moves in any one direction. For example, if the device needs to download information, switch radios, inquire about services that are available, or any other task that may require some lead time or that may need a certain amount of power, knowing that the device is moving in a direction in which it will maintain a certain amount of power or stay underneath an umbrella of a network allows the device to make decisions.

Although embodiments of the present invention are described using 802.11 access points, one skilled in the relevant arts would know that other types of devices that can transmit a beacon from a known location, such as, but not limited to, other types of proximity sensors, may be used as well. Although embodiments of the present invention are described using radio frequencies, one skilled in the relevant art(s) would know that other transmission mediums, such as optical, acoustical, etc., may be used.

Embodiments of the present invention are described using access points as a type of proximity sensor. Thus, access point, proximity sensor, and sensor are used synonymously.

Every access point (AP) provides a finite coverage area within which it provides bidirectional communication with client 802.11 radios, such as, but not limited to, cellular phones, PDAs, laptop computers, etc. Upon installation of APs in a building, each AP is assigned a location in a known coordinate system, such as, but not limited to, WGS 84 (World Geodetic System 1984), which is well known to those skilled in the relevant art(s). In an embodiment of the present invention, the location of the AP may be embedded into the AP itself. In another embodiment of the present invention, the location of the AP may be maintained in a database for later retrieval. Each AP provides a known transmission strength in free space. The transmission strength of the AP may be obtained by estimation using the antenna and amplifiers of the AP. Alternatively, the transmission strength of the AP may be measured in an anechoic chamber.

Client devices scan the RF (radio frequency) spectrum for AP beacons. Each AP is associated with a geographical location and a simple radius of its coverage range. This may be accomplished within the AP/client low-level protocol or with prior information obtained by the client about each AP location. The area defined by the union of all range coverage observable by the client is the location where the client device resides.

FIG. 1 is a diagram 100 illustrating the movement of a mobile device through a building implementing proximity sensors according to an embodiment of the present invention. Diagram 100 includes proximity sensors A, B, and C. Proximity sensors A, B, and C may be access points (APs) or any other type of fixed proximity sensors. Proximity sensors A, B, and C are placed in fixed locations and they radiate their location information within a fixed proximity. The physical locations of proximity sensors A, B, and C are as shown in FIG. 1. The coverage of sensor B is shown as an ellipse with a north orientation. The coverage of sensor A is shown as an ellipse with an east orientation. The coverage of sensor C is shown as a 180° arc.

Zones are used to define certain areas of the building based on the locations of the sensors. Zones 1 through 7, shown in FIG. 1, are uniquely defined. Zone 1 represents an area in which coverage for sensor A only can be seen by the mobile device. Zone 2 represents an area in which coverage for both sensor B and sensor A can be seen by the mobile device. At this location, the coverage of sensor A and sensor B intersect each other. Zone 3 represents an area in which coverage for sensor B only can be seen by the mobile device. Zone 4 represents an area in which coverage for all three sensors (sensors A, B, and C) can be seen by the mobile device. At this location, the coverage of sensor A, B, and C intersect each other. Zone 5 represents an area in which coverage for both sensor A and sensor C can be seen by the mobile device. At this location, the coverage of sensor A and sensor C intersect each other. Zone 6 represents an area in which coverage for both sensor B and sensor C can be seen by the mobile device. At this location, the coverage of sensor B and sensor C intersect each other. Zone 7 represents an area in which coverage for sensor C only can be seen by the mobile device.

A heavy dotted line 102 moving from left to right illustrates the movement of the mobile device (not shown) through the building. The mobile device is only able to identify sensors that are within its receiver sensitivity. Using conventional methods, any sensor outside the mobile device's receiver sensitivity would not be used to define the location of the mobile device. For example, starting from left to right, as the mobile device enters the building, the mobile device is scanning the RF spectrum for proximity sensor beacons. At this time, the mobile device can only see the beacon from sensor B. This places the mobile device anywhere within zone 3. As the mobile device moves along line 102 where it can see the beacons from both sensor B and sensor A, then the mobile device will be located anywhere within zone 2. Continuing along line 102, when the mobile device is able to see the beacons from all three sensors (sensor A, sensor B, and sensor C), the mobile device will be located anywhere within zone 4. When the mobile device is no longer able to see the beacon from sensor B, yet can still see the beacons from sensor A and sensor C, the mobile device will be located within zone 5. And lastly, when the beacon from sensor A is no longer in the mobile device's view and the mobile device can only see the beacon from sensor C, the mobile device will be located within zone 7. As the mobile device moved along line 102, the mobile device was restricted to only being able to communicate with local proximity information, such as, for example, sensor B when the mobile device was in zone 3, sensors B and A when the mobile device was in zone 2, sensors A, B, and C when the mobile device was in zone 4, sensors A and C when the mobile device was in zone 5, and sensor C when the mobile device was in zone 7. Information was actually lost when the mobile-device moved out of a sensor's range.

Embodiments of the present invention allow the mobile device to acquire information from the unobservable sensors as well as the observable sensors. This enables the mobile device to determine its location by what it does not observe as well as what it does observe. This is accomplished by sharing individual proximity sensor observations with other peer proximity sensors and clients. Each proximity sensor can describe what it can transmit as well as what neighboring sensors can transmit. A database of information is built to allow the mobile device to access information at different levels of depth. For example, in FIG. 1, sensor B can describe what it can see and what sensors A and C can see as well. So when the mobile device enters the building at zone 3, it is able to communicate with sensor B. At that time sensor B will provide the mobile device with location information from sensor B as well as location information from the sensors that sensor B can see, which are sensors A and C. In other words, sensor B can also provide the mobile device with information about the infrastructure of the building, including the excluded areas (i.e., areas that the mobile device cannot observe). The mobile device can, in turn, use that information to refine its location and determine any actions that it may take given its location and what it now knows is available in different areas of the building. For example, if the mobile device needs to download some data, and it knows that within 200 feet of the device is a rich environment for the mobile device to download data, the mobile device may wait until it reaches this point to download the data. Thus, the difference between what the building infrastructure can see and what the mobile device can see creates exclusion zones that the mobile device may use to define and refine the location of the mobile device.

Figure 2:
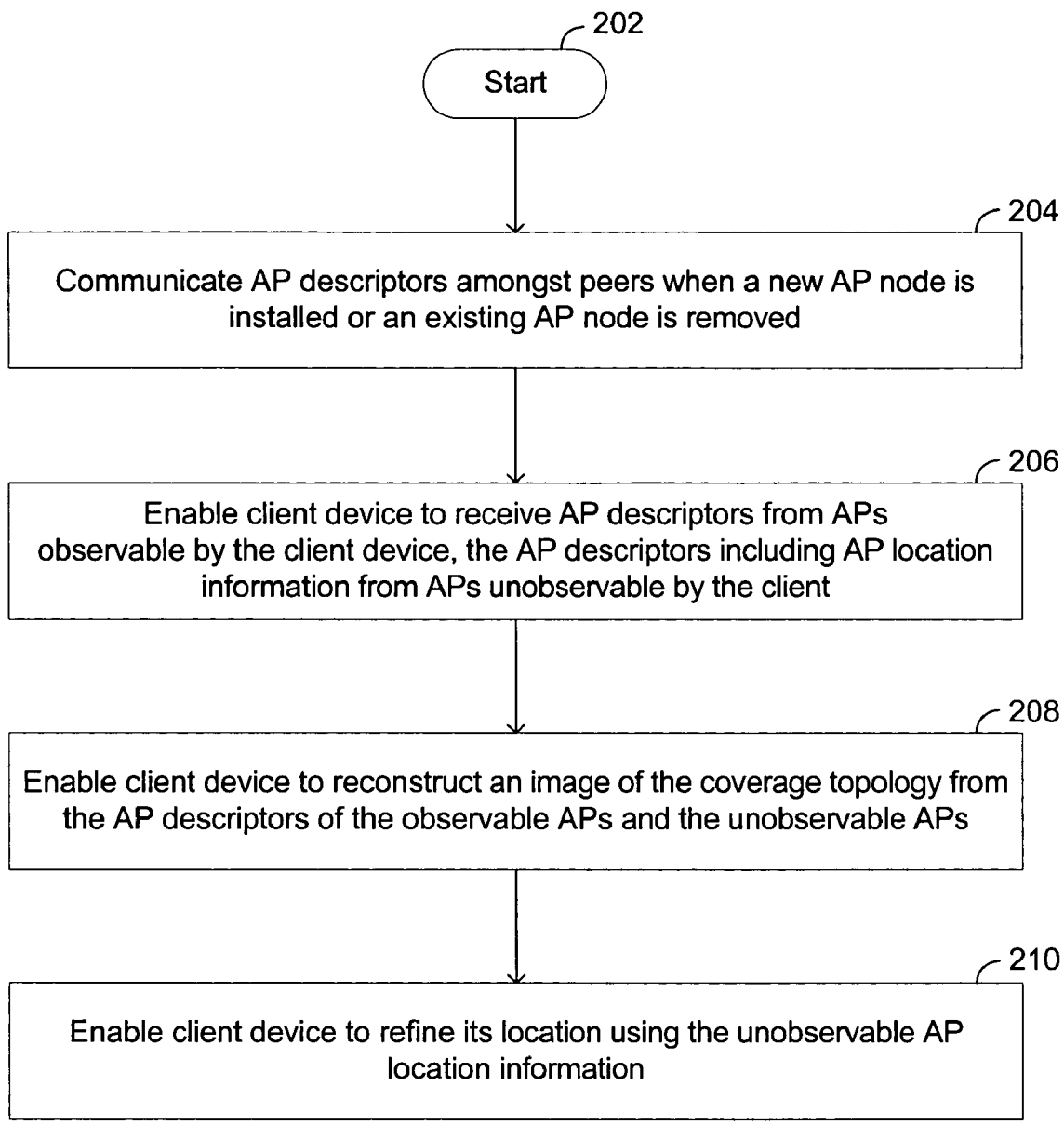
FIG. 2 is a flow diagram describing an exemplary method for enabling a client device to use observable as well as unobservable proximity sensors to define its location according to an embodiment of the present invention.

FIG. 2 is a flow diagram 200 describing an exemplary method for enabling a client device to use observable as well as unobservable proximity sensors to define its location according to an embodiment of the present invention. The invention is not limited to the embodiment described herein with respect to flow diagram 200. Rather, it will be apparent to persons skilled in the relevant art(s) after reading the teachings provided herein that other functional flow diagrams are within the scope of the invention. The process begins with block 202, where the process immediately proceeds to block 204.

In block 204, during installation of an access point (AP) node, deletion of an AP node, or update of an AP node in an infrastructure, AP communications are performed. In one embodiment, updating AP nodes may be performed periodically. AP communications allow each AP in the infrastructure to determine what it sees and hears from other APs in the infrastructure. Each AP may also query the other APs in the infrastructure to determine what they can see from their vantage point. This allows a database of information to be built up to include various levels of depth of information regarding what each AP can see as well as what other neighboring APs within the infrastructure can see. This information can then be shared with the client device.

Figure 3:
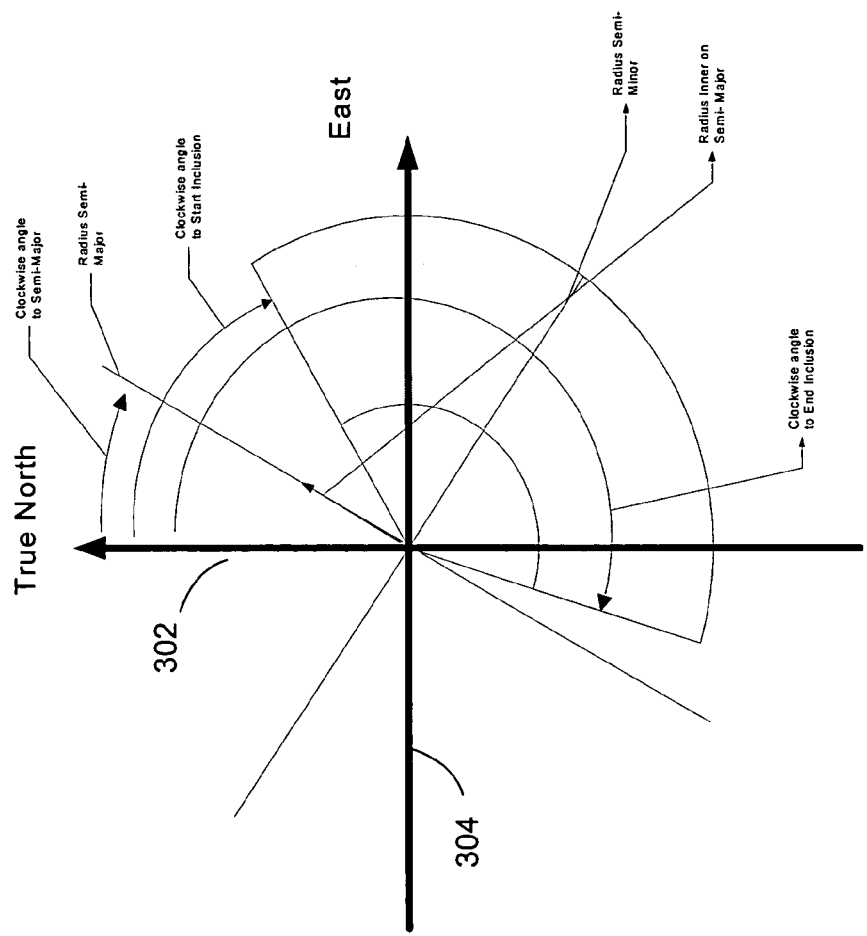
FIG. 3 is a diagram illustrating an exemplary coverage descriptor used to describe the location of a proximity sensor according to an embodiment of the present invention.

Each AP is self-describing. The self-describing information for each AP may include, but is not limited to, the antenna pattern of the AP, the transmit range of the AP, the location of the AP, and a unique identifier for the AP. Each AP is defined by a location description. The location description includes the coverage area and physical location for the AP. FIG. 3 illustrates an exemplary coverage descriptor that may be used to describe the physical location of the AP. The AP coverage may be defined by one of two generalized coverage descriptors: elliptic and geometric. FIG. 3 illustrates a generalized elliptic coverage descriptor. The elliptic coverage descriptor defines a region of signal coverage based on an AP's transmitted power settings, location, and antenna pattern. Coverage descriptor 300 includes a y-axis 302 (from south to north) and an x-axis 304 (from west to east). The parameters used to describe an AP's coverage include, but are not limited to, radius semi-major, radius semi-minor, radius inner on semi-major, radius inner on semi-minor, clockwise angle to semi-major; clockwise angle to start inclusion, and clockwise angle to end inclusion.

A circular pattern, which is the simplest case for the elliptic coverage descriptor, may be defined by an ellipse having semi-major and semi-minor radii of equal length, inner major and minor radii of zero, and the major axis may be at any angle from true north. With regards to the geometric coverage descriptor, one skilled in the relevant art(s) would know that the geometric coverage descriptor may be in the form of various geometric shapes. A geometric shape comprises a plurality of physical points, each physical point connecting to the next physical point in a clockwise fashion with the last physical point connecting to the first physical point. One skilled in the relevant art(s) would know that coverage descriptors can be extended to three (3) dimensions as well without departing from the spirit and scope of the invention.

Returning to FIG. 2, block 204, in one embodiment, when an AP is installed, the location description may be embedded within the AP. In an alternative embodiment, the location description may be stored in a database for later retrieval.

In block 206, any observable AP beacon within an RF spectrum scanning range of a client device shares its coverage descriptor with the client device. The coverage descriptor will also include coverage descriptors for neighboring APs that are observable by any AP seen by the client (i.e., any AP that lies within the client's RF spectrum scanning range). Although the neighboring APs can be seen by any observable AP beacon within the RF spectrum scanning range of the client device, they are not observable by the client device. Thus, if the client device can see one AP and the one AP can see many other APs, then the sharing of this information between APs becomes available to the client device.

Each AP passes its coverage descriptor and a nested list of descriptors that it can receive from the neighboring APs in the infrastructure to the client. For example, referring back to FIG. 1, when the mobile device is within zone 3, proximity sensor B will provide the mobile device with a coverage descriptor for sensor B, and since sensors A and C are within sensor B's view, sensor B will also provide the mobile device with coverage descriptors for sensors A and C as well.

Returning to FIG. 2, block 206, the client device may request a depth of a descriptor chain it wishes to receive. For example, if the client device requests a chain depth of one, the client device will receive a descriptor for the current AP(s) in its view (i.e, within the client's RF scanning range) and each neighboring AP that the current AP(s) in its view can see. If a chain depth of two is requested, the client device will receive all of the above mentioned descriptors as well as what each neighboring AP can see that the current AP(s) in its view can see. Thus, within the neighboring AP descriptor are descriptors for each of the neighbor's neighbor. The chain depth keeps expanding until it includes what the last level of APs in the chain can see. By allowing the client device to request the depth of the descriptor chain, the client device may avoid overloading the memory of the client device as well as the bandwidth of the communication link.

In one embodiment, client device depth requests may be filtered as well. For example, the client device may request everything in a certain corridor ten (10) layers deep. In another example, the client device may request to have everything about a specific room within the infrastructure, such as, for example, a conference room or an auditorium.

Figure 4:
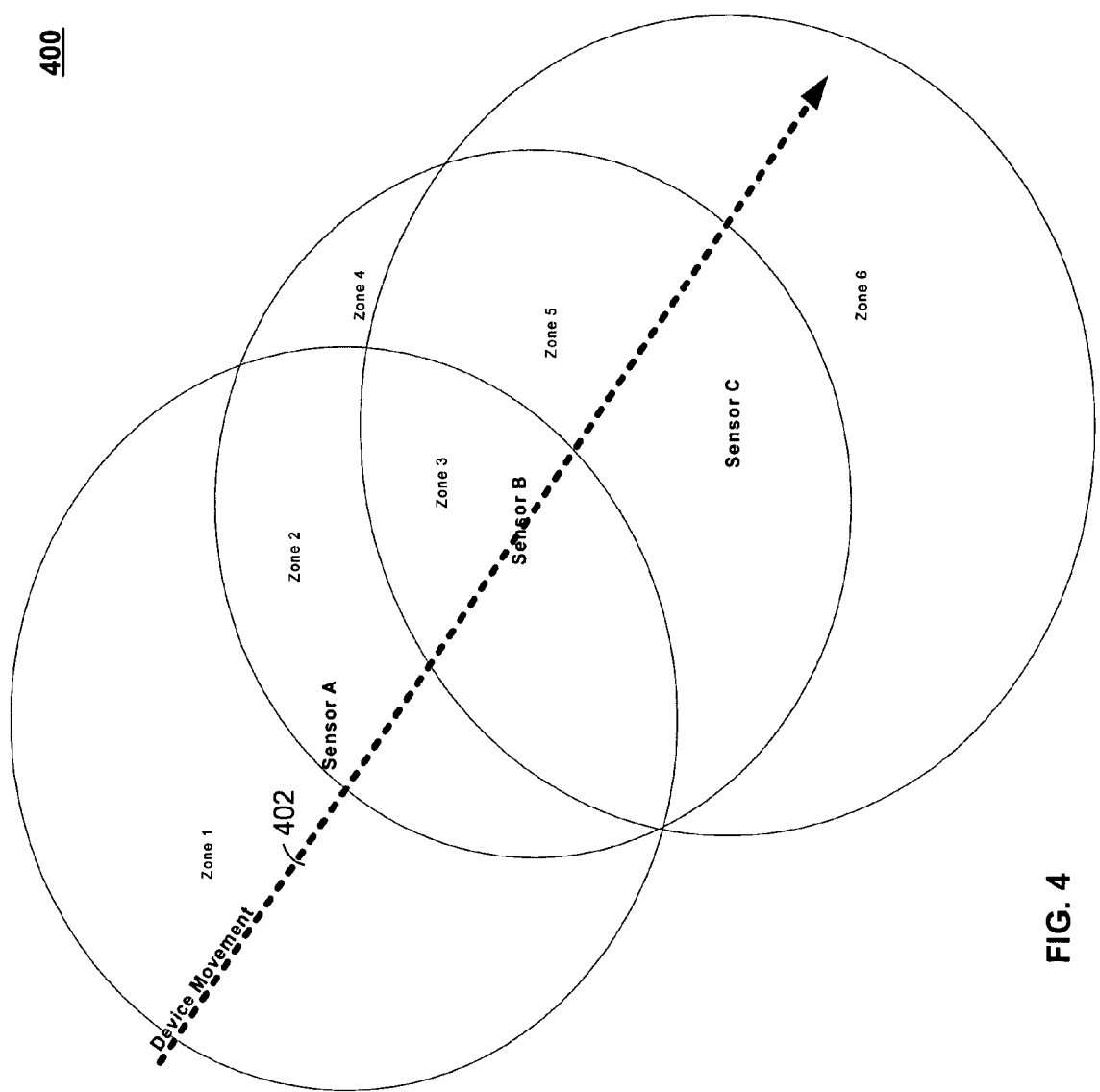
FIG. 4 is a diagram illustrating an exemplary topology descriptor chain according to an embodiment of the present invention.

FIG. 4 is a diagram 400 illustrating an exemplary topology descriptor chain according to an embodiment of the present invention. Diagram 400 includes three proximity sensors A, B, and C, and a black dotted line 402 indicating from left to right a downward movement of a client device (not shown). Proximity sensors A, B, and C may be access points (AP) or any other type of proximity sensor used to provide location information.

Proximity sensor B intersects both proximity sensors A and C. Proximity sensor A receives coverage topology (or descriptors) from proximity sensor B. Proximity sensor B receives coverage topology from proximity sensors A and C. Proximity sensor C receives coverage topology from B (which includes coverage topology for proximity sensors A and C). Thus, the topology description being received from B includes the chain that B is within A and C's coverage range and that C is not within A's coverage range. By sharing this information a few nodes deep, a very simple coverage topology emerges that can be used by the client device to reconstruct an image of the coverage as the client device moves through the infrastructure.

As the client device moves from left to right, the client device may compare what it observes with what the proximity sensors describe from their vantage points. Upon the client device discovering proximity sensor A, the client device will receive a descriptor for B and C as well as A. However, the client device knows that it cannot observe proximity sensors B and C, and therefore can determine its location to be within zone 1. As the client device picks up proximity sensor B, it can narrow its location to zone 2 by interrogating the descriptor chain against the observable beacons in the scan. As the client device picks up proximity sensor C, it can determine its location to zone 3 by again interrogating the descriptor chain against the observable beacons in the scan. As the client device continues along dotted line 402 to where it can only observe proximity sensor C, it can then determine its location to be within zone 6. Although embodiments of the invention have been described using simplistic geometries, geometries may become more complex when varied coverage shapes are used and more levels of depths in the chain are used.

In an alternative embodiment, instead of having the proximity sensors provide their descriptions and the descriptions of all observable proximity sensors, a map of the proximity sensors and a description of their coverage pattern may be provided to the client device for use while traversing the infrastructure. In yet another alternative embodiment, the client device may learn the proximity sensor topology by moving through the infrastructure and recording information about each proximity sensor that comes in and out of the view of the client device.

Returning back to FIG. 2, in block 208, using the coverage topology that was received by the client device, the client device can reconstruct an image of the coverage as it moves through the infrastructure. Enabling the client device to compare what it observes with what it cannot observe, helps to reduce the location uncertainty of the client device and provides the client device with the ability to make conclusions based on the movement of the client device and what's coming up in front of the client device prior to the client device's radio even knowing what is going to be available.

In block 210, the client device may determine the zone in which it occupies. In one embodiment, a Monte Carlo sampling of the probabilities that the client device is within any one of the zones may be used. Monte Carlo sampling methods are well known to those skilled in the relevant art(s). The input to the Monte Carlo sampling method is a simple likelihood of the signal being received at any given range from the known proximity sensor location. The likelihood function, which is also well known, can be calculated using the proximity sensor's effective radiated power, receiver sensitivity, and signal-to-noise ratio of the proximity sensor's beacon. The received signal strength may be averaged over at least ten one-second intervals. This energy is scaled by the receiver sensitivity. Although embodiments of the invention have been described using a Monte Carlo sampling method for determining the zone location of the client device, one skilled in the relevant art(s) would know that other methods to locate the zone may be used as well.

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that each include a processor and a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, and the like. Embodiments of the present invention may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hardwired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. An indoor location awareness method comprising:
    performing access point (AP) communications in an infrastructure each time a new access point is added, an access point is deleted, or the access point is updated within the infrastructure, wherein each AP includes self describing information about its coverage and information about neighboring APs within each AP's range;
    enabling a client device to receive coverage descriptors from all observable APs within an RF (radio frequency) scanning range of the client device; and
    enabling the client device to use the coverage descriptors to reconstruct an image of the AP coverage as the client device traverses the infrastructure,
    wherein performing access point communications comprises:
        establishing coverage descriptors for each AP;
        enabling each of the APs to acquire the coverage descriptor for each of the neighboring APs, wherein a neighbor coverage descriptor includes coverage descriptors for each of the neighbor APs' neighbors; and
        building a database for each of the APs that includes the coverage descriptor for each of the APs and a nested list of neighbor coverage descriptors, the nested list of neighbor descriptors representing a descriptor chain for each AP, wherein the descriptor chain includes observable and unobservable AP coverage descriptors.

2. The method of claim 1, further comprising enabling the client device to define a location of the client device based on the reconstructed image.

3. The method of claim 2, wherein enabling the client device to define its location based on the reconstructed image includes enabling the client device to define its location using Monte Carlo sampling.

4. The method of claim 1, wherein self-describing information comprises one or more of an AP antenna pattern, an AP transmit range, an AP location, and an AP identifier.

5. The method of claim 1, further comprising enabling the client device to make decisions based on the movement of the client device by enabling the client to compare what the client can observe with information provided by the coverage descriptors that the client cannot observe.

6. The method of claim 1, wherein the client can request a level of depth of the descriptor chain that the client would like to receive from the observable APs of the client.

7. The method of claim 6, wherein the client request for the level of depth of the descriptor chain comprises a filtered level of depth descriptor chain.

8. The method of claim 1, wherein enabling a client device to receive coverage descriptors from all observable APs within an RF (radio frequency) scanning range of the client device includes enabling the client to receive coverage descriptors for all observable APs within the RF scanning range of the client device and a nested list of descriptors identifying what each observable AP covers, wherein the nested list of descriptors includes unobservable APs by the client device.

9. The method of claim 1, wherein enabling a client device to receive coverage descriptors from all observable APs within an RF scanning range of the client device comprises providing the client device with a map of all APs and a description of their coverage pattern for use while the client traverses the infrastructure.

10. The method of claim 1, wherein enabling a client device to receive coverage descriptors from all observable APs within an RF scanning range of the client device comprises enabling the client device to learn the coverage descriptors for all observable APs as the client device moves through the infrastructure, wherein the client device will record the information about each AP as it moves in and out of each AP's view.

11. The method of claim 1, wherein each AP is defined by a location description, wherein the location description includes a coverage area of the AP and a physical location of the AP.

12. The method of claim 11, wherein the location description is embedded in the AP.

13. The method of claim 11, wherein the location description is maintained in a database.

14. The method of claim 1, wherein the client device comprises a mobile device.

15. A tangible computer readable storage medium having a plurality of machine accessible instructions, stored therein, wherein when the instructions are executed by a processor, the instructions provide for:

performing access point (AP) communications in an infrastructure each time a new access point is added, access point is deleted, or the access point is updated within the infrastructure, wherein each AP includes self describing information about its coverage and information about neighboring APs within each AP's range;

enabling a client device to receive coverage descriptors from all observable APs within an RF (radio frequency) scanning range of the client device; and enabling the client device to use the coverage descriptors to reconstruct an image of the AP coverage as the client device traverses the infrastructure, wherein performing access point communications comprises:

establishing coverage descriptors for each AP;

enabling each of the APs to acquire the coverage descriptor for each of the neighboring APs, wherein a neighbor coverage descriptor includes coverage descriptors for each of the neighbor APs' neighbors; and building a database for each of the APs that includes the coverage descriptor for each of the APs and a nested list of neighbor coverage descriptors, the nested list of neighbor descriptors representing a descriptor chain for each AP, wherein the descriptor chain includes observable and unobservable AP coverage descriptors.

16. The medium of claim 15, further comprising instructions for enabling the client device to define a location of the client device based on the reconstructed image.

17. The medium of claim 16, wherein instructions for enabling the client device to define its location based on the reconstructed image includes instructions for enabling the client device to define its location using Monte Carlo sampling.

18. The medium of claim 15, wherein self-describing information comprises one or more of an AP antenna pattern, an AP transmit range, an AP location, and an AP identifier.

19. The medium of claim 15, further comprising instructions for enabling the client device to make decisions based on the movement of the client device by providing instructions for enabling the client to compare what the client can observe with information provided by the coverage descriptors that the client cannot observe.

20. The medium of claim 15, wherein the client can request a level of depth of the descriptor chain that the client would like to receive from the observable APs of the client.

21. The medium of claim 20, wherein the client request for the level of depth of the descriptor chain comprises a filtered level of depth descriptor chain.

22. The medium of claim 15, wherein instructions for enabling a client device to receive coverage descriptors from all observable APs within an RF (radio frequency) scanning range of the client device includes instructions for enabling the client to receive coverage descriptors for all observable APs within the RF scanning range of the client device and a nested list of descriptors identifying what each observable AP covers, wherein the nested list of descriptors includes unobservable APs by the client device.

23. The medium of claim 15, wherein instructions for enabling a client device to receive coverage descriptors from all observable APs within an RF scanning range of the client device comprises instructions for providing the client device with a map of all APs and a description of their coverage pattern for use while the client traverses the infrastructure.

24. The medium of claim 15, wherein instructions for enabling a client device to receive coverage descriptors from all observable APs within an RF scanning range of the client device comprises instructions for enabling the client device to learn the coverage descriptors for all observable APs as the client device moves through the infrastructure, wherein the client device will record the information about each AP as it moves in and out of each AP's view.

25. The medium of claim 15, wherein each AP is defined by a location description, wherein the location description includes a coverage area of the AP and a physical location of the AP.

26. The medium of claim 25, wherein the location description is embedded in the AP.

27. The medium of claim 25, wherein the location description is maintained in a database.

28. The medium of claim 15, wherein the client device comprises a mobile device.

* * * * *